(12) United States Patent
Yang et al.

(10) Patent No.: US 10,698,771 B2
(45) Date of Patent: Jun. 30, 2020

(54) ZERO-DATA-LOSS WITH ASYNCHRONOUS REDO SHIPPING TO A STANDBY DATABASE

(71) Applicant: Oracle International Corporation, Redwood Shores, CA (US)

(72) Inventors: Hongjie Yang, Foster City, CA (US); Yunrui Li, Fremont, CA (US); Mahesh Baburao Girkar, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 245 days.

(21) Appl. No.: 15/266,375

(22) Filed: Sep. 15, 2016

(65) Prior Publication Data
US 2018/0074915 A1    Mar. 15, 2018

(51) Int. Cl.
*G06F 7/00*     (2006.01)
*G06F 17/00*    (2019.01)
(Continued)

(52) U.S. Cl.
CPC ...... *G06F 11/1469* (2013.01); *G06F 11/1438* (2013.01); *G06F 11/1471* (2013.01);
(Continued)

(58) Field of Classification Search
CPC ............ G06F 11/1469; G06F 16/273; G06F 2201/84; G06F 11/2097; G06F 11/2069;
(Continued)

(56) References Cited

U.S. PATENT DOCUMENTS

| 4,507,751 A | 3/1985 | Gawlick et al. |
| 4,710,926 A | 12/1987 | Brown et al. |

(Continued)

FOREIGN PATENT DOCUMENTS

| EP | 0 503 417 A2 | 9/1992 |
| EP | 050180 A | 9/1992 |

(Continued)

OTHER PUBLICATIONS

Teschke, et al., "Concurrent Warehouse Maintenance Without Comprising Session Consistency", 1998, 10 pages.
(Continued)

*Primary Examiner* — Azam M Cheema
(74) *Attorney, Agent, or Firm* — Hickman Palermo Becker Bingham LLP (57) ABSTRACT

Herein are techniques of zero data loss with asynchronously replicated redo logs. In an embodiment, a first server instance (FSI) of a plurality of server instances (PSI) of a primary database (PDB) sends, to a standby database (SDB) during an shutdown of FSI, a first recovery count (RC) and a remainder of an instance redo log (IRL). In response to recovering FSI, a second server instance of PSI increments a recovery counter to a second RC (SRC), publishes SRC to PSI, and sends SRC to SDB. After restarting FSI, FSI makes a change to contents of PDB, and stores, into IRL, a redo entry that defines the change. During failover, a database management system (DBMS) detects whether RCs associated with FSRL and SSRL are unanimous. If unanimous, DBMS fully rolls forward SDB by replaying FSRL and SSRL. Otherwise, DBMS limits replay and indicates that FSRL and SSRL might be inconsistent.

21 Claims, 6 Drawing Sheets

(51) Int. Cl.
 *G06F 11/14* (2006.01)
 *G06F 16/27* (2019.01)
 *G06F 11/20* (2006.01)

(52) U.S. Cl.
 CPC ...... *G06F 11/2028* (2013.01); *G06F 11/2038* (2013.01); *G06F 11/2048* (2013.01); *G06F 11/2097* (2013.01); *G06F 16/273* (2019.01); *G06F 2201/84* (2013.01)

(58) Field of Classification Search
 CPC ............. G06F 11/2023; G06F 11/2076; G06F 11/2082
 See application file for complete search history.

(56) References Cited

U.S. PATENT DOCUMENTS

| | | |
|---|---|---|
| 4,782,325 A | 11/1988 | Jeppsson et al. |
| 4,945,474 A | 7/1990 | Elliott et al. |
| 5,095,421 A | 3/1992 | Freund |
| 5,146,571 A | 9/1992 | Logan |
| 5,182,752 A | 1/1993 | DeRoo et al. |
| 5,233,618 A | 8/1993 | Gilder et al. |
| 5,241,675 A | 8/1993 | Sheth et al. |
| 5,263,156 A | 11/1993 | Bowen et al. |
| 5,287,496 A | 2/1994 | Chen et al. |
| 5,327,556 A | 7/1994 | Mohan |
| 5,329,628 A | 7/1994 | Yomamoto et al. |
| 5,333,265 A | 7/1994 | Orimo et al. |
| 5,333,316 A | 7/1994 | Champagne et al. |
| 5,355,477 A | 10/1994 | Strickland et al. |
| 5,369,757 A | 11/1994 | Spiro et al. |
| 5,388,196 A | 2/1995 | Pajak et al. |
| 5,418,940 A | 5/1995 | Mohan |
| 5,423,037 A | 6/1995 | Hvasshovd |
| 5,454,102 A | 9/1995 | Tang et al. |
| 5,487,164 A | 1/1996 | Kirchhofer et al. |
| 5,553,279 A | 9/1996 | Goldring |
| 5,555,404 A | 9/1996 | Torbjørnsen et al. |
| 5,559,991 A | 9/1996 | Kanfi |
| 5,574,906 A | 11/1996 | Morris |
| 5,581,753 A | 12/1996 | Terry et al. |
| 5,581,754 A | 12/1996 | Terry et al. |
| 5,588,012 A | 12/1996 | Oizumi |
| 5,603,024 A | 2/1997 | Goldring |
| 5,613,113 A | 3/1997 | Goldring |
| 5,696,775 A | 12/1997 | Nemazie et al. |
| 5,717,893 A | 2/1998 | Mattson |
| 5,734,898 A | 3/1998 | He |
| 5,742,792 A | 4/1998 | Yanai et al. |
| 5,778,430 A | 7/1998 | Ish et al. |
| 5,805,799 A | 9/1998 | Fredrickson et al. |
| 5,806,076 A | 9/1998 | Ngai et al. |
| 5,870,758 A | 2/1999 | Bamford et al. |
| 5,870,759 A | 2/1999 | Bauer et al. |
| 5,870,763 A | 2/1999 | Lomet |
| 5,893,930 A | 4/1999 | Song |
| 5,924,096 A | 7/1999 | Draper et al. |
| 5,956,731 A | 9/1999 | Bamford et al. |
| 5,960,436 A | 9/1999 | Chang et al. |
| 5,974,427 A | 10/1999 | Reiter |
| 5,983,277 A | 11/1999 | Heile et al. |
| 5,991,771 A | 11/1999 | Falls et al. |
| 6,009,432 A | 12/1999 | Tarin |
| 6,009,542 A | 12/1999 | Koller et al. |
| 6,014,669 A | 1/2000 | Slaughter et al. |
| 6,026,406 A | 2/2000 | Huang et al. |
| 6,044,367 A | 3/2000 | Wolff |
| 6,067,550 A | 5/2000 | Lomet |
| 6,094,708 A | 7/2000 | Hilla et al. |
| 6,098,190 A | 8/2000 | Rust et al. |
| 6,151,607 A | 11/2000 | Lomet |
| 6,192,377 B1 | 2/2001 | Ganesh et al. |
| 6,226,650 B1 | 5/2001 | Mahajan |
| 6,272,500 B1 | 8/2001 | Sugita |
| 6,298,319 B1 | 10/2001 | Heile et al. |
| 6,298,425 B1 | 10/2001 | Whitaker et al. |
| 6,324,661 B1 | 11/2001 | Gerbault et al. |
| 6,353,835 B1 | 3/2002 | Lieuwen |
| 6,393,485 B1 | 5/2002 | Chao et al. |
| 6,438,724 B1 | 8/2002 | Cox et al. |
| 6,446,234 B1 | 9/2002 | Cox et al. |
| 6,449,623 B1 | 9/2002 | Bohannon et al. |
| 6,516,327 B1 | 2/2003 | Zondervan et al. |
| 6,523,032 B1 | 2/2003 | Sunkara |
| 6,535,869 B1 | 3/2003 | Housel, III |
| 6,560,743 B2 | 5/2003 | Plants |
| 6,574,717 B1 | 6/2003 | Ngai et al. |
| 6,691,139 B2 | 2/2004 | Ganesh et al. |
| 6,728,879 B1 | 4/2004 | Atkinson |
| 6,732,125 B1 | 5/2004 | Autrey et al. |
| 6,775,681 B1 | 8/2004 | Ballamkonda |
| 6,804,671 B1 | 10/2004 | Loaiza et al. |
| 6,839,751 B1 | 1/2005 | Dietz et al. |
| 6,886,084 B2 | 4/2005 | Kawashima et al. |
| 6,980,988 B1 | 12/2005 | Demers et al. |
| 7,003,694 B1 * | 2/2006 | Anderson, Jr. ...... G06F 11/2023 707/999.202 |
| 7,024,656 B1 | 4/2006 | Ahad |
| 7,076,508 B2 | 7/2006 | Bourbonnais et al. |
| 7,136,970 B2 | 11/2006 | Yoshiya et al. |
| 7,149,769 B2 | 12/2006 | Lubbers et al. |
| 7,149,858 B1 | 12/2006 | Kiselev |
| 7,155,463 B1 | 12/2006 | Wang et al. |
| 7,222,136 B1 | 5/2007 | Brown et al. |
| 7,228,354 B2 | 6/2007 | Chambliss et al. |
| 7,237,027 B1 | 6/2007 | Raccah et al. |
| 7,246,275 B2 | 7/2007 | Therrien et al. |
| 7,257,689 B1 | 8/2007 | Baird |
| 7,287,034 B2 | 10/2007 | Wong et al. |
| 7,290,017 B1 | 10/2007 | Wang et al. |
| 7,363,538 B1 | 4/2008 | Joydip et al. |
| 7,370,068 B1 | 5/2008 | Pham et al. |
| 7,464,113 B1 * | 12/2008 | Girkar ................. G06F 11/2074 |
| 7,599,967 B2 | 10/2009 | Girkar et al. |
| 7,600,063 B2 | 10/2009 | Loaiza |
| 7,627,612 B2 | 12/2009 | Ahal et al. |
| 7,627,614 B2 | 12/2009 | Hu et al. |
| 7,644,084 B2 | 1/2010 | Rapp |
| 7,734,580 B2 | 6/2010 | Lahiri et al. |
| 7,761,425 B1 | 7/2010 | Erickson et al. |
| 7,822,717 B2 | 10/2010 | Kappor et al. |
| 7,895,216 B2 | 2/2011 | Longshaw et al. |
| 7,966,293 B1 | 6/2011 | Owara et al. |
| 7,996,363 B2 | 8/2011 | Girkar et al. |
| 8,024,396 B2 | 9/2011 | Seddukhin |
| 8,286,182 B2 | 10/2012 | Chan |
| 8,364,648 B1 | 1/2013 | Sim-Tang |
| 8,433,684 B2 | 4/2013 | Munoz |
| 8,468,320 B1 | 6/2013 | Stringham |
| 8,473,953 B2 | 6/2013 | Bourbonnais |
| 8,478,718 B1 | 7/2013 | Ranade |
| 8,560,879 B1 | 10/2013 | Goel |
| 8,615,578 B2 | 12/2013 | Hu et al. |
| 8,694,733 B2 | 4/2014 | Krishnan et al. |
| 8,832,142 B2 | 9/2014 | Marwah et al. |
| 8,838,919 B2 | 9/2014 | Shi et al. |
| 8,856,484 B2 | 10/2014 | Ben-Tsion et al. |
| 8,868,492 B2 | 10/2014 | Garin et al. |
| 8,868,504 B2 | 10/2014 | Aranna et al. |
| 8,930,312 B1 | 1/2015 | Rath |
| 9,026,679 B1 | 5/2015 | Shmuylovich |
| 9,077,579 B1 | 7/2015 | Chu |
| 9,146,934 B2 | 9/2015 | Hu et al. |
| 9,244,996 B2 | 1/2016 | Bourbonnais |
| 9,767,178 B2 | 9/2017 | Srivastava et al. |
| 2002/0049950 A1 | 4/2002 | Loaiza et al. |
| 2002/0091718 A1 | 7/2002 | Bohannon et al. |
| 2002/0112022 A1 | 8/2002 | Kazar et al. |
| 2002/0133508 A1 | 9/2002 | LaRue et al. |
| 2002/0143755 A1 | 10/2002 | Wynblatt et al. |
| 2002/0165724 A1 | 11/2002 | Blankesteijn |
| 2003/0046396 A1 | 3/2003 | Richter et al. |
| 2003/0061537 A1 | 3/2003 | Cha et al. |

(56) References Cited

U.S. PATENT DOCUMENTS

| | | |
|---|---|---|
| 2003/0126114 A1 | 7/2003 | Tedesco |
| 2003/0140050 A1 | 7/2003 | Li |
| 2003/0140288 A1 | 7/2003 | Loaiza et al. |
| 2003/0212660 A1 | 11/2003 | Kerwin |
| 2003/0217064 A1 | 11/2003 | Walters |
| 2003/0217071 A1 | 11/2003 | Kobayashi et al. |
| 2004/0003087 A1 | 1/2004 | Chambliss et al. |
| 2004/0062106 A1 | 4/2004 | Ramesh et al. |
| 2004/0193570 A1 | 9/2004 | Yaegar |
| 2004/0267809 A1 | 12/2004 | East et al. |
| 2005/0005083 A1 | 1/2005 | Ozdemir |
| 2005/0038831 A1 | 2/2005 | Souder et al. |
| 2005/0055380 A1 | 3/2005 | Thompson et al. |
| 2005/0120025 A1 | 6/2005 | Rodriguez et al. |
| 2005/0165798 A1 | 7/2005 | Cherkauer et al. |
| 2006/0004691 A1 | 1/2006 | Sifry |
| 2006/0015542 A1 | 1/2006 | Pommerenk |
| 2006/0047713 A1 | 3/2006 | Gornshtein |
| 2006/0064405 A1 | 3/2006 | Jiang et al. |
| 2006/0080646 A1 | 4/2006 | Aman |
| 2006/0129595 A1 | 6/2006 | Sankaran |
| 2006/0168585 A1 | 7/2006 | Grcevski |
| 2006/0173833 A1 | 8/2006 | Purcell et al. |
| 2006/0200497 A1 | 9/2006 | Hu et al. |
| 2006/0212481 A1 | 9/2006 | Stacey et al. |
| 2006/0212573 A1 | 9/2006 | Loaiza |
| 2006/0224551 A1 | 10/2006 | Lariba-Pey |
| 2006/0242513 A1 | 10/2006 | Loaiza et al. |
| 2007/0038689 A1 | 2/2007 | Shinkai |
| 2007/0083505 A1 | 4/2007 | Ferrari et al. |
| 2007/0100912 A1 | 5/2007 | Pareek et al. |
| 2007/0156957 A1 | 7/2007 | MacHardy et al. |
| 2007/0226277 A1 | 9/2007 | Holenstein et al. |
| 2007/0239680 A1 | 10/2007 | Oztekin et al. |
| 2008/0005112 A1 | 1/2008 | Shavit |
| 2008/0016074 A1 | 1/2008 | Ben-dyke et al. |
| 2008/0059492 A1 | 3/2008 | Tarin |
| 2008/0104283 A1 | 5/2008 | Shin et al. |
| 2008/0126846 A1 | 5/2008 | Vivian et al. |
| 2008/0147599 A1 | 6/2008 | Young-Lai |
| 2008/0162587 A1 | 7/2008 | Auer |
| 2008/0177803 A1 | 7/2008 | Fineberg et al. |
| 2008/0222311 A1 | 9/2008 | Lee |
| 2008/0228835 A1 | 9/2008 | Lashley et al. |
| 2008/0244209 A1 | 10/2008 | Seelam et al. |
| 2008/0256143 A1 | 10/2008 | Reddy et al. |
| 2008/0256250 A1 | 10/2008 | Wakefield et al. |
| 2008/0281784 A1 | 11/2008 | Zane et al. |
| 2008/0281865 A1 | 11/2008 | Price et al. |
| 2009/0024384 A1 | 1/2009 | Kobayashi et al. |
| 2009/0034377 A1 | 2/2009 | English et al. |
| 2009/0063591 A1 | 3/2009 | Betten et al. |
| 2009/0119295 A1 | 5/2009 | Chou et al. |
| 2009/0182746 A1 | 7/2009 | Mittal et al. |
| 2009/0248756 A1 | 10/2009 | Akidau |
| 2009/0268903 A1 | 10/2009 | Bojinov et al. |
| 2009/0307290 A1 | 12/2009 | Barsness et al. |
| 2010/0036843 A1 | 2/2010 | MacNaughton et al. |
| 2010/0082648 A1 | 4/2010 | Potapov |
| 2010/0122026 A1 | 5/2010 | Umaamageswaran et al. |
| 2010/0145909 A1 | 6/2010 | Ngo |
| 2010/0211577 A1 | 8/2010 | Shimuzu et al. |
| 2010/0235335 A1 | 9/2010 | Heman et al. |
| 2010/0250549 A1 | 9/2010 | Muller et al. |
| 2010/0318570 A1 | 12/2010 | Narasinghanallur et al. |
| 2011/0004586 A1 | 1/2011 | Cherryholmes et al. |
| 2011/0029569 A1 | 2/2011 | Ganesh et al. |
| 2011/0060724 A1 | 3/2011 | Chan |
| 2011/0066791 A1 | 3/2011 | Goyal et al. |
| 2011/0087633 A1 | 4/2011 | Kreuder et al. |
| 2011/0087637 A1 | 4/2011 | Sundaram et al. |
| 2011/0099179 A1 | 4/2011 | Balebail |
| 2011/0138123 A1 | 6/2011 | Aditya et al. |
| 2011/0145207 A1 | 6/2011 | Agrawal et al. |
| 2011/0231362 A1 | 9/2011 | Attarde et al. |
| 2011/0238655 A1 | 9/2011 | Clorain et al. |
| 2011/0307450 A1 | 12/2011 | Hahn et al. |
| 2012/0054158 A1 | 3/2012 | Hu et al. |
| 2012/0054533 A1 | 3/2012 | Shi et al. |
| 2012/0054546 A1* | 3/2012 | Kampouris ......... G06F 11/0709 714/16 |
| 2012/0109926 A1 | 5/2012 | Novik et al. |
| 2012/0173515 A1 | 7/2012 | Jeong et al. |
| 2012/0278282 A1 | 11/2012 | Lu |
| 2012/0284228 A1 | 11/2012 | Ghosh |
| 2012/0323849 A1 | 12/2012 | Garin et al. |
| 2012/0323971 A1 | 12/2012 | Pasupuleti |
| 2013/0085742 A1 | 4/2013 | Baker et al. |
| 2013/0117237 A1 | 5/2013 | Thomsen et al. |
| 2013/0132674 A1 | 5/2013 | Sundrani |
| 2013/0198133 A1 | 8/2013 | Lee |
| 2013/0212068 A1 | 8/2013 | Talius et al. |
| 2014/0040218 A1 | 2/2014 | Kimura et al. |
| 2014/0059020 A1 | 2/2014 | Hu et al. |
| 2014/0075493 A1 | 3/2014 | Krishnan et al. |
| 2014/0095452 A1 | 4/2014 | Lee |
| 2014/0095530 A1 | 4/2014 | Lee et al. |
| 2014/0095546 A1 | 4/2014 | Kruglikov et al. |
| 2014/0164331 A1 | 6/2014 | Li |
| 2014/0258241 A1* | 9/2014 | Chen ................ G06F 17/30371 707/683 |
| 2014/0279840 A1 | 9/2014 | Chan et al. |
| 2015/0032694 A1 | 1/2015 | Rajamani et al. |
| 2015/0088811 A1 | 3/2015 | Hase et al. |
| 2015/0088822 A1 | 3/2015 | Raja et al. |
| 2015/0088824 A1 | 3/2015 | Kamp et al. |
| 2015/0088830 A1 | 3/2015 | Kamp |
| 2015/0088926 A1 | 3/2015 | Chavan et al. |
| 2015/0089125 A1 | 3/2015 | Mukherjee et al. |
| 2015/0089134 A1 | 3/2015 | Mukherjee et al. |
| 2015/0120659 A1 | 4/2015 | Srivastava et al. |
| 2015/0120780 A1 | 4/2015 | Jain |
| 2015/0254240 A1 | 9/2015 | Li |
| 2015/0317183 A1 | 11/2015 | Little |
| 2016/0179867 A1 | 6/2016 | Li et al. |
| 2017/0116252 A1 | 4/2017 | Krishnaswamy |
| 2018/0121511 A1 | 5/2018 | Li |
| 2018/0165324 A1 | 6/2018 | Krishnaswamy |
| 2018/0349458 A1 | 12/2018 | Guirguis |

FOREIGN PATENT DOCUMENTS

| | | |
|---|---|---|
| EP | 2 608 070 A1 | 6/2013 |
| GB | 1 332 631 A | 10/1973 |
| GB | 2505 185 A | 2/2014 |
| JP | 59-081940 | 5/1984 |
| JP | 02-189663 | 7/1990 |
| JP | 08-235032 | 9/1996 |
| JP | 10-040122 | 2/1998 |
| JP | 10-240575 | 9/1998 |
| WO | WO 2007/078444 A1 | 7/2007 |

OTHER PUBLICATIONS

Vassilakis et al., "Implementation of Transaction and Concurrency Control Support in a Temporal DBMS" Information Systems, vol. 23, No. 5, 1998, 16 pages.

Bober et al., "On Mixing Queries and Transactions Via Multiversion Locking", IEEE, 1992, 11 pages.

Mohan et al., "Efficient and Flexible Methods for Transient Versioning of Records to Avoid Locking by Reading-Only Transactions", XP000393583, IBM Almaden Research Center, Dated Feb. 6, 1992, 11 pages.

U.S. Appl. No. 13/161,315, filed Jun. 15, 2011, Final Office Action, dated Jan. 6, 2014.

U.S. Appl. No. 13/161,315, filed Jun. 15, 2011, Notice of Allowance, dated Jun. 26, 2014.

U.S. Appl. No. 13/161,315, filed Jun. 15, 2011, Office Action, dated Jun. 5, 2013.

Rajeev Kumar et al., Oracle DBA, A Helping Hand, Container Database and Pluggable Database (CDB & PDB), retrieved from the internet on Dec. 4, 2013, 2 pages.

(56) References Cited

OTHER PUBLICATIONS

Preimesberger, Chris, "Oracle Profits Up, but Revenues Slip" Oracle, dated Sep. 20, 2012, 2 pages.
Oracle Help Center, "Database 2 Day + Data Replication and Integration Guide", 3 Accessing and Modifying Information in Multiple Databases, dated 2016, 14 pages.
Oracle Base, Multitenant: Create and Configure a Pluggable Database (PDB) in Oracle Database 12c Release 1 (12.1), dated Jan. 8, 2014, 16 pages.
Muhammad Anwar, "How to Install Oracle 12c Multitenant Pluggable Database", Dated Feb. 24, 2012, 27 pages.
Garcia-Molina et al., "Database System Implementation", dated Jan. 1, 2000, 84 pages.
Francisco Munoz et al., "Oracle Database 12c Backup and Recovery Survival Guide", dated Sep. 24, 2013, 8 pages.
Dominic Betts et al., "Developing Multi-Tenant Applications for the Cloud", 3rd Edition, Microsoft, 2012, 246 pages.
Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.
Anonymous: "Oracle-Base—Multitenant: Overview of Container Databases (CDB) and Pluggable Databases (PDB)", dated Mar. 3, 2014, 4 pages.
Anonymous, :An Oracle White Paper Oracle Database Appliance: Migration Strategies, dated Jun. 2012, 14 pages.
Zhe, Li, et al., "PERF join: an alternative to two-way semijoin and Bloomjoin" Proceedings of the 1995 ACM, New York. NY, US., 1995, pp. 187-144.
Shao et al., "Clotho: Decoupling Memory Page Layout from Storage Organization", Proceedings of the 30th VLDB Conference, Toronto, Canada, 2004, 12 pages.
Schaffner et al., "A Hybrid Row-Column OLTP Database Architecture for Operational Reporting", dated Aug. 24, 2008, 14 pages.
Ramamurthy, Ravishankar, "A Case for Fractured Mirrors" Proceedings of the 28th VLDB Conference, dated, 2002, 12 pages.
Phipps, Colin:, "Mapping Deflated Files", Internet Article, dated Jan. 6, 2013, http://zsync.moria.org.uk/paper/ch03s02.html, 3 pages.
Oracle Database Administrator's Guide, 11g Release 2 (11.2), Chapter 26, Feb. 2010, 54 pages. http://download.oracle.com/docs/cd/E11882_01/server.112/e10595.pdf.
Oracle Database Administrator's Guide, 10g Release 2 (10.2), Chapter 24, May 2006, 34 pages. http://download.oracle.com/docs/cd/B19306_01/server.102/b14231.pdf.
O'Neil, P., et al., "Multi-table joins through bitmapped join indices", SIGMOD Record, ACM, New York, NY, US, vol. 24, No. 3, Sep. 1, 1995, pp. 8-11, ISSN: 0163-5808.
Nirmesh, Malviya, "Recovery Algorithms for In-Memory OLTP Databases", Master of Science Thesis, dated Jul. 1, 2012, 66 pages.
Loizos, M., et al., "Improving distributed join efficiency with extended bloom filter operations", Advanced Networking and Applications, 2007. AINA '07., 21st international Conf. IEEE, May 1, 2007.
Mackert, F. Lothar et al., "R* optimizer validation and performance evaluation for local queries" SIGMOD Record, ACM, New York, NY, US., vol. 15, No. 2, Jun. 1, 1986, pp. 84-95, ISSN: 0163-5808.
IBM, "A Scheduling Algorithm for Processing Mutually Exclusive Workloads in a Multi-System Configuration", dated Aug. 19, 2002, IEEE, 3 pages.

Zhang Ho et al., "In-Memory Big Data Management and Processing: A Survery", IEEE Transactions on Knowledge and Data Engineering, vol. 27, No. 7, dated Jul. 31, 2015, 30 pages.
Vishal Sikka et al., "Efficient Transaction Processing in SAP Hana Database", Proceedings of the 2012, International Conference on Management of Data, dated Jan. 31, 2012, 12 pages.
Farber et al., "SAP HANA Database—Data Management for Modern Business Applications", SIGMOD Record, dated Dec. 2011, vol. 40, No. 4, 8 pages.
Khalid Sayood:, "Introduction to data Compression", Morgan Kaufmann Publisher, dated Dec. 1996, 4 pages.
Antoni Cau, et al., "Specifying Fault Tolerance within Stark's Formalism," 1993, IEEE, pp. 392-401.
IBM Corp., "IBM OS/2 Extended Edition Configuration," Feb. 1990, IBM Technical Disclosure Bulletin, vol. 32, No. 9B, pp. 446-451.
Alapati, S., Backing Up Databases. In: Expert Oracle Database 11g Administration, Apress, dated 2009, pp. 1-70.
Oracle, "Oracle Data Guard", Concepts and Administration 12c Release 1 (12.1), dated Nov. 2015, 50 pages.
Oracle, "Oracle Active Data Guard", Real-Time Protection and Availability, Oracle White Paper, dated Oct. 2015, 22 pages.
Oracle, "Maximum Availability Architecture", Oracle Best Practices for High Availability, dated Sep. 2011, 42 pages.
Nadimpalli, Rajeev, "How to Run Two or More Databases in Different Time Zones on the Same Machine", dated May 2002, 7 pages.
Li, U.S. Appl. No. 15/339,525, filed Oct. 31, 2016, Interview Summary, dated Jul. 31, 2019.
Li, U.S. Appl. No. 15/399,525, filed Oct. 31, 2016, Office Action, dated May 2, 2019.
Srivastava, U.S. Appl. No. 15/482,225, filed Apr. 7, 2017, Notice of Allowance, dated Dec. 20, 2019.
Li, U.S. Appl. No. 15/339,525, filed Oct. 31, 2016, Final Office Action, dated Nov. 18, 2019.
Werner Vogels, "Eventually Consistent", CACM, dated Dec. 19, 2007, 4 pages.
V Sikka et al, Efficient Transaction Processing in SAP HANA Database: the End of a Column Store Myth, SIGMOD dated 2012, 11 pages.
Oracle® Flashback Technologies, http://www.oracle.com/technetwork/database/features/availability/flashback-overview-082751.html, last viewed on Dec. 5, 2019, 3 pages.
Oracle® TimesTen In-Memory Database and TimesTen Application—Tier Database Cache, www.oracle.com/technetwork/database/database-technologies/timesten/overview/index.html, viewed on Dec. 5, 2019, 1pg.
Oracle Help Center, Oracle® TimesTen Application—Tier Database Cache User's Guide: Read-only Cache Groups, http://stdoc.us.oracle.com/12/12102/TTCAC/define.htm#TTCAC211, viewed on Dec. 5, 2019, 10 pages.
Ma et al., On benchmarking online social media analytical queries. In First International Workshop on Graph Data Management Experiences and Systems (GRADES '13). ACM, Article, dated 2013, 7 pages.
Labrinidis et al., "Balancing Performance and Data Freshness in Web Database Servers", VLDB dated 2003, 12 pages.
Jeff Erickson, In-Memory Acceleration for the Real-Time Enterprise,http://www.oracle.com/us/corporate/features/database-in-memory-option/index.html, last viewed on Dec. 5, 2019, 4 pages.
Gary Marchionini, Exploratory Search: From Finding to Understanding. Communications. ACM 49, 4, dated Apr. 2006, pp. 41-46.

* cited by examiner

ZERO-DATA-LOSS WITH ASYNCHRONOUS REDO SHIPPING TO A STANDBY DATABASE

CROSS-REFERENCE TO RELATED APPLICATIONS

This application is related to U.S. Pat. No. 7,599,967 B2, filed Mar. 20, 2007, titled "No Data Loss System With Reduced Commit Latency," which is incorporated by reference as if fully set forth herein.

FIELD OF THE DISCLOSURE

This disclosure relates to database failover from a multi-instance database. Techniques are presented that achieve zero data loss with asynchronously replicated redo logs.

BACKGROUND

A database management system (DBMS) may have multiple server instances for a same database. For example, sharding, replication, and horizontal scaling are topologies that may utilize multiple server instances for a database.

Typically each server instance occupies a separate host computer, such as a physical or virtual machine. Server instances may exchange data content and control information over a computer network. For example, server instances may collaborate to answer a federated query, to synchronize replication, and to rebalance data storage demand.

Assuming that failure rates of server instances are additive with horizontal scaling, it is axiomatic that the mean time between failure within a cluster or other federation of server instances will decrease as the cluster grows (gains server instances). As such, a robust cluster should tolerate crashed server instances and allow them to be rehabilitated and return to service by rejoining the cluster.

Rehabilitation of a server instance may entail recovery (logical repair of corrupt files), replay of redo logs to apply committed transactions that were inflight during the crash, and restarting the server instance.

A redo log may consist of multiple files that are pre-allocated, rotated, and that store digests of changes made to a database more or less as soon as they occur. Redo log-files are filled with redo records.

A redo record, also called a redo entry, is made up of a group of change vectors, each of which is a description of a change made to a data block in the database. For example, changing a salary value in an employee table may generate a redo record containing change vectors that describe changes to a data block for a table. A redo record represents a database write, regardless of whether the enclosing transaction of the write has or has not been committed.

A typical high-availability database configuration consists of one primary (production) database and one or more standby databases. In operation, this configuration typically uses redo log replication.

The primary database may use synchronous and asynchronous transport mode for redo log replication. The prior industry solution uses synchronous transport mode to achieve zero data loss, also known as no data loss (NDL).

Synchronous redo transport mode transmits redo data to the standby databases synchronously at more or less the same time when the same redo is persisted to the online redo logs of the primary database. Synchronous redo transport mode is required to guarantee zero data loss in case of situations where the primary database suffers a crash from which it cannot recover.

However, using synchronous redo shipping during normal activity at the primary database can impact performance of the primary database, because the process that writes redo to the online redo logs at the primary database also ships the same redo to the standby database. For example, transaction commit latency may increase and overall transaction throughput may decrease.

Asynchronous redo transport mode transmits redo data asynchronously, after it has been persisted to the online redo logs at the primary database. As such, it is possible for transactions to commit at the primary database, but the redo generated by that transaction may not be available at the standby database.

Asynchronous redo transport mode does not impact the primary database performance. However, it does not guarantee zero data loss in case of a disaster at the primary database.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 Example Distributed System
    2.1 Topology
    2.2 Redo Log Replication
    2.3 Data Consistency
    2.4 Recovery Count
    2.5 Count Propagation
  3.0 Failover Process
    3.1 Instance Recovery
    3.2 Return To Service 3.3 Failover
3.4 Conditional Replay
3.5 Inconsistency Found
4.0 Asynchronous Replication
    4.1 Transport Asynchrony
    4.2 Standby Activity
5.0 Transactions
    5.1 Commit
6.0 Rolling Forward
    6.1 Global Ordering
    6.2 Seeking Past
    6.3 Stopping Early
    6.4 Hybrid Techniques
7.0 Hardware Overview

1.0 General Overview

Techniques are provided for database failover from a multi-instance database. These techniques achieve zero data loss with asynchronously replicated redo logs.

In embodiments, a primary database and a standby database are arranged as a high-availability pair that may failover. During ordinary operation, redo logs are asynchronously replicated from the primary database to the standby database.

The primary database has multiple server instances that may underperform or malfunction in ways that cause redo log replicas at the standby database to be inconsistent. For example, replication lag may cause a redo log of a server instance to be incompletely replicated temporarily. More severe aberrations may cause individual server instances to crash, be rehabilitated, and returned to service.

The standby database is operated by a standby DBMS. In an embodiment, the primary database may become unavailable, and a human decision may be made to manually direct the standby DBMS to failover. In another embodiment, the standby DBMS may detect loss of availability of the primary database and react by automatically performing failover. Failover is episodic, in that it may result from (or otherwise accompany) crashes of server instances of the primary database.

Furthermore with asynchronous replication, a server instance that was recovered from a crash and restarted will rejoin the primary database and process new transactions before adequately synchronizing (catching up) the standby database. For example, the server instance may accumulate (buffer) new redo data for new transactions, thereby imposing replication lag that may or may not impact redo log replica consistency.

However, mere inspection of redo log replica timestamps or redo sequence numbers may be insufficient for the standby DBMS to detect that a redo log of a server instance was incompletely replicated when failover occurred. Whereas because failover and server instance crashes may be somewhat contemporaneous, the recovery of a server instance presents a natural milestone or point in time that all server instances should observe, and that the standby DBMS may use to detect incomplete replication.

The primary database is operated by a primary DBMS, which may tally (count) recoveries of server instances and notify the standby DBMS of the recovery count whenever a primary server instance undergoes a shutdown procedure, ships all outstanding redo changes to the standby DBMS, and the standby DBMS has acknowledged receipt of those redo changes and has preserved them in its standby redo log. The recovery count in such cases may be associated with the corresponding standby redo log. As such, each server instance maintains a replica of a shared recovery counter of how many server instance crashes the primary database experienced. During failover, the standby DBMS may inspect copies of those recovery counts to detect whether or not redo log replicas at the standby database are inconsistent (stale).

In an embodiment, each server instance of the primary database may contain one or more instance redo logs that accumulate redo entries. A server instance creates redo entries whenever it changes contents of the primary database. The redo entries may be appended to a particular instance redo log. An asynchronous replication stream may transmit copies of the redo entries from the server instances to the standby database. The copies of the redo entries are appended to a standby redo log. There is one standby redo log in the standby database for each instance redo log in the primary database.

A first server instance of the primary database may detect that itself has suffered a fatal error and reacts by performing a shutdown of itself. The first server instance synchronously flushes redo entries that are within its redo buffer by sending them to the standby DBMS.

When the standby DBMS acknowledges receipt of the flushed redo entries, the first server instance sends a current value of a recovery count to the standby DBMS. Upon receipt of the recover count, the standby DBMS may extract and store the recovery count.

When the first server instance crashes, its files may be inconsistent. A surviving server instance of the primary database recovers the integrity of those files, which allows the first server instance to later be restarted. Before restarting, the surviving server instance increments its own recovery counter and publishes the new value to the server instances of the primary database.

At the standby database, a standby DBMS receives redo entries, recovery counts, and redo log identifiers in a replication stream from the primary database. The DBMS appends the redo entries to a standby redo log that corresponds to an instance redo log that is identified by the received identifier. The standby DBMS stores an association between the received recovery count and the standby redo log that corresponds to the received identifier.

After the first server instance restarts, it returns to service and resumes asynchronous redo replication. This includes making changes to contents of the primary database, creating redo entries for those changes, writing those redo entries to an instance redo log, and replicating those redo entries to the standby database. Because the redo replication stream is asynchronous, replication of some redo entries might not occur when the primary database fails over to the standby database.

During failover, the standby DBMS may roll forward the standby database based on recovery counts and the age of redo entries within the standby redo logs. Rolling forward is a technique to make the contents of a database reflect changes specified in redo log(s). In the techniques herein, rolling forward fully (to the end of all relevant standby redo logs) is conditioned upon the standby DBMS detecting that the standby redo logs are consistent. Rolling forward may entail distinguishing between standby redo logs that should have some of their redo entries replayed and standby redo logs that should not be replayed. Rolling forward may also entail distinguishing which portion of a standby redo log should be replayed.

To detect consistency, the standby DBMS applies, from the standby redo logs, redo entries that were normally received by the standby DBMS before the crashed server instance(s) flushed its remaining redo entries. Then the standby DBMS prepares to apply redo entries received as flushed during emergency shutdown(s) of the crashed server instance(s) and compares the recovery counts that are each associated with a respective standby redo log in the standby redo logs. If the values of those recovery counts are unanimous (all have the same value), then rolling forward fully (to the end of all relevant standby redo logs) may occur with guaranteed zero data loss. Otherwise, the standby DMBS signals that zero data loss is not guaranteed, and rolling forward should be limited (not to the end of all relevant standby redo logs). This latter case involves those situations where a primary server may have crashed without being able to ship all of its redo to the standby DBMS, in which case the standby redo log does not have an associated recovery count.

In another scenario, none of the surviving primary instances were able to ship the redo log of the crashed instance to the standby DBMS. In this scenario, rolling forward by the standby DBMS cannot apply redo changes beyond a certain point in time as explained herein.

2.0 Example Distributed System

Figure 1:
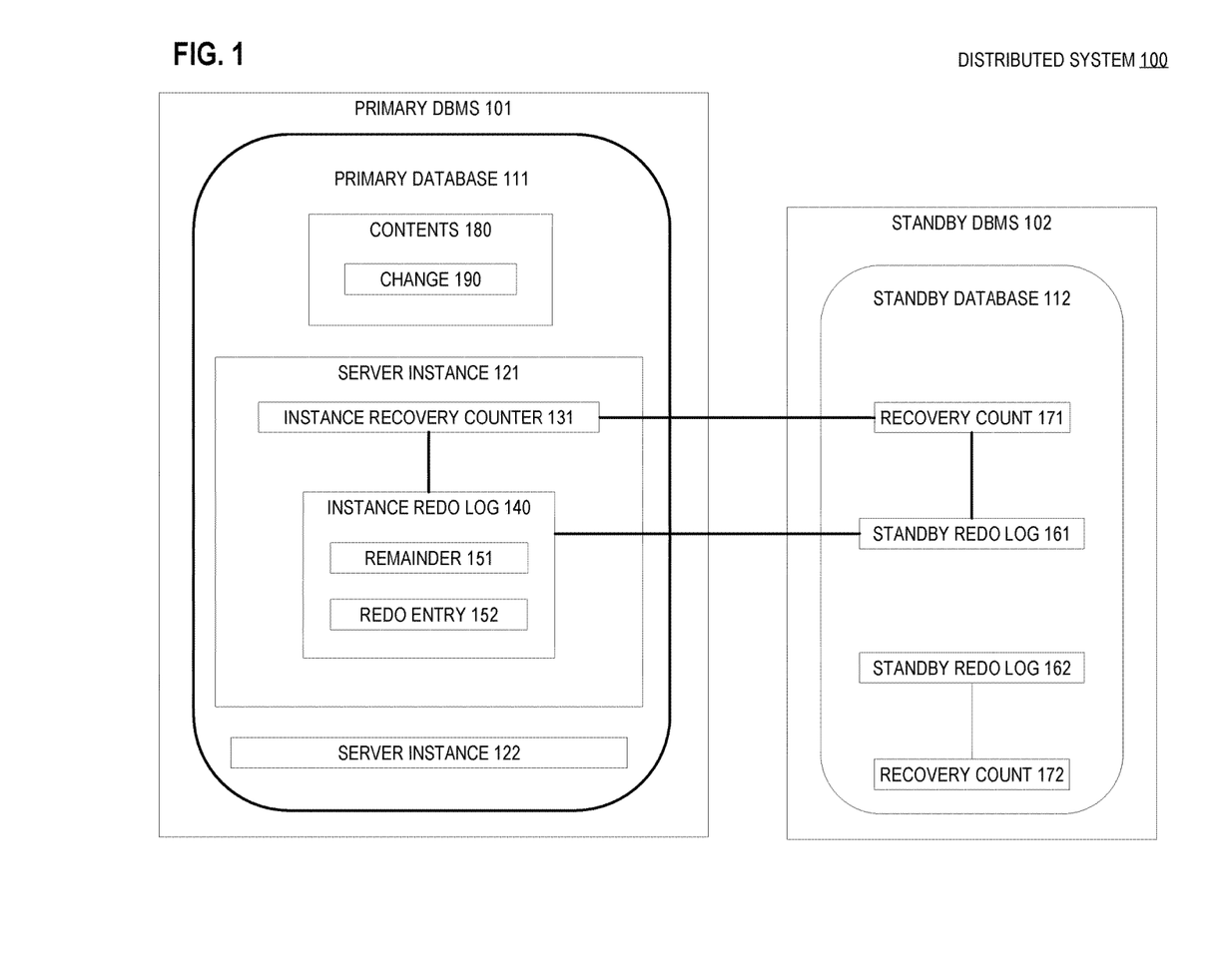
FIG. 1 is a block diagram that depicts an example distributed system that achieves zero data loss during failover with asynchronously replicated redo logs, in an embodiment.

FIG. 1 is a block diagram that depicts an example distributed system 100 that achieves zero data loss during failover with asynchronously replicated redo logs, in an embodiment. Distributed system 100 contains database management systems (DBMSs) 101-102, each of which occupies one or more connected computers.

For high availability, each of DBMS 101-102 includes respective databases 111-112, which are separate database servers that coordinate for redundancy. DBMSs 101-102 operate only one of databases 111-112 as a live system of record with connected clients, such as primary database 111.

Database 111-112 each has a separate copy of data contents of database 100. For example, primary database 111 contains contents 180 that may occupy data files for durability.

2.1 Topology

In a preferred embodiment, databases 111-112 do not occupy a same computer. For example, they may reside in respective data centers and may communicate over the global Internet.

For reliability, availability, or horizontal scalability, primary database 111 is a multi-instance database server. As such, primary database 111 is operated by at least server instances 121-122, which may also operate other databases (not shown).

Server instances 121-122 collaborate to provide distributed management of contents 180. In a preferred embodiment, server instances 121-122 are collocated, such as on a local area network (LAN), but do not occupy a same computer.

Server instances 121-122 share a cross-mounted file system. In a preferred embodiment not shown, server instances 121-122 and network attached storage (NAS) may occupy one rack and collaborate over a backplane.

When one of server instances 121-122 crashes, its files may be corrupt. A surviving server instance may exploit the cross-mounted filesystem shared with the crashed server instance to recover the files of the crashed server instance.

2.2 Redo Log Replication

During operation, primary DBMS 101 may use primary database 111 to record content changes, such as data manipulation of ordinary records, such as relational table rows. For example, primary DBMS 101 may apply change 190 to contents 180.

Standby database 112 may be a hot (active) standby that receives a live stream of content changes that occurred recently at primary database 111. Standby DBMS 102 applies the changes to standby database 112 to keep standby database 112 current with primary database 111.

Within the replication content stream, DBMS 101 may transfer entries, such as redo entry 152, of redo logs from primary database 111 to standby database 112. For example, standby database 112 has standby redo log 161 that accumulates entries that also occur in instance redo log 140 of server instance 121.

Although not shown, server instance 121 may have other instance redo logs, for which standby database 112 may have standby redo logs as more or less replicas. Likewise, standby database 112 may have other standby redo logs, such as 162, as replicas of instance redo logs within server instance 122, although not shown.

2.3 Data Consistency

Consistency between server instance and standby redo logs is not always guaranteed. For example, buffering and other asynchrony may degrade data synchronization, such as by replication lag. Furthermore to some extent, the same problems that cause failover may also cause inconsistency of standby redo logs.

When replication of redo logs is synchronous, consistency is more or less always guaranteed. However, inconsistency may arise from asynchronous replication. For example, buffering and other asynchrony may degrade data synchronization, such as by replication lag. For example, instance redo log 140 may have remainder 151 that has not yet been sent to standby database 112.

2.4 Recovery Count

Consequentially during failover, standby DBMS 102 uses the techniques herein to assess the consistency of standby redo logs and react accordingly. For example, related U.S. Pat. No. 7,599,967 discloses a no data lost (NDL) flag that may in limited cases be used to detect inconsistency, as explained therein.

However asynchronous replication combined with the episodic nature of failover, which may be accompanied by multiple and perhaps repeated crashes of server instances, can introduce race and other boundary conditions that can confuse (cause malfunction of) consistency detection that relies on the accuracy of a stored NDL flag that might actually be stale (not current). To accommodate such boundary conditions and thereby increase the accuracy of consistency detection, recovery counting is introduced. Consistency detection is discussed later herein.

Recovery counting exploits information about server instance crashes that may occur within primary database 111 before or during failover. A recovery count is associated with primary database 111.

Each time a server instance crashes, primary DBMS 101 increments the recovery count by one. Furthermore, primary DBMS 101 propagates copies of the recovery count to be retained within server instances 121-122 and standby database 112.

If a server instance or standby database 112 becomes inconsistent, the distributed copies of the recovery count may disagree on what is the current value. When the DBMS detects such a discrepancy during a failover, standby DBMS 102 may presume standby redo log inconsistency and react accordingly.

2.5 Count Propagation

The distributed copies of the recovery count are as follows. Each server instance 121-122 contains its own replica of the shared instance recovery counter. For example, server instance 121 has instance recovery counter 131.

Although not shown, server instance 121 may have multiple instance redo logs, such as 140. Each redo log has its own file. However, server instance 121 uses only one (current) redo log at a time, which enables redo log-file rotation.

When server instance 121 sends redo entry 152 to standby database 112, the identity of instance redo log 140 is sent with redo entry 152. Furthermore, standby database 112 has a respective standby redo log for each instance redo log.

If and only if redo entry 152 is sent while flushing buffered redo during an emergency self-shutdown of server instance 121, then the current value of instance recovery counter 131 is sent along with redo entry 152. In an embodiment, multiple redo entries may be sent in a replication message that includes a message header that identifies a redo log and optionally contains a recovery count that is present (e.g. non-zero or non-negative) only if the message is the final message of an emergency redo flush.

For example, during ordinary (not crashing) asynchronous redo replication, replication messages lack a recovery count. Whenever a replication messages lacks a recovery count, the standby DBMS responsively records that the corresponding standby redo log has no associated recovery count, such as by setting the associated recovery count to zero or negative.

In an embodiment, the recovery count is sent in its own separate message, immediately after the final message that flushes redo is acknowledged by the standby DBMS.

During emergency shutdown, the standby DBMS may receive a replication message and detect whether the message has an optional recovery count. The presence of a recovery count indicates that server instance 121 has finished replication (sent all buffered redo data), thereby guaranteeing that the corresponding standby redo log is complete (consistent and trustworthy).

For each standby redo log, standby DBMS 102 stores an association between that standby redo log and the last recovery count received with redo data for that standby redo log. For example, recovery counts 171-172 are associated with respective standby redo logs 161-162.

A recovery count is sent only during a primary server instance shutdown due to a fatal error. A recovery count in a standby redo log which was receiving redo from a primary server instance may be missing if the primary server instance crashes without successfully shipping all outstanding redo entries to the standby DBMS. The logistics of recovery counting are as follows.

3.0 Failover Process

Figure 2:
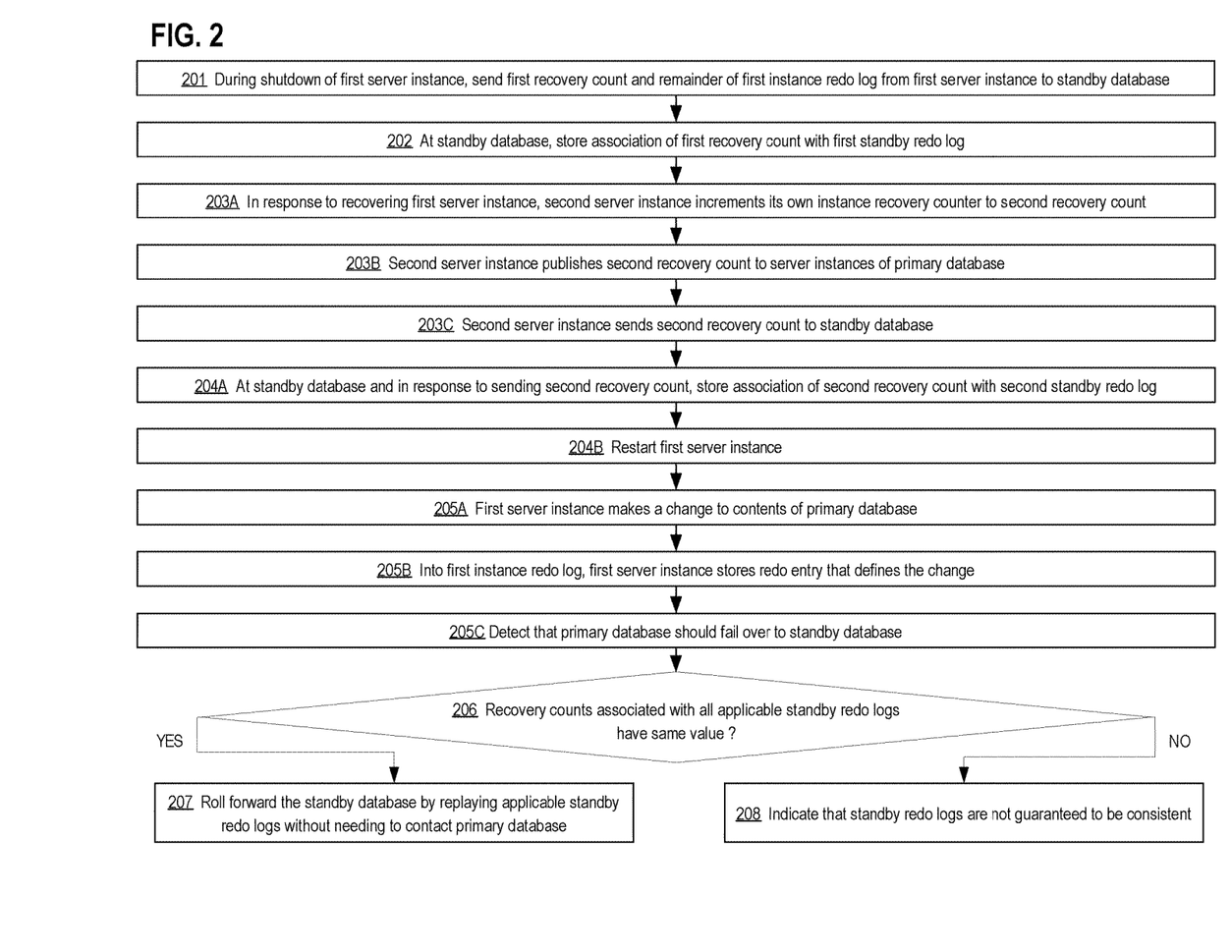
FIG. 2 is a flow diagram that depicts an example failover process that achieves zero data loss with asynchronously replicated redo logs, in an embodiment.

FIG. 2 is a flow diagram that depicts an example emergency failover process that achieves zero data loss with asynchronously replicated redo logs. FIG. 2 is discussed with reference to FIG. 1.

In step 201 during an emergency shutdown of a first server instance, it sends a remainder of a first instance redo log to the standby database, waits for acknowledgement, and then sends its recovery count to the standby DBMS, where it is associated with a standby redo log and recorded as such. For example, server instance 121 detects a fatal error has occurred, such as memory heap exhaustion, call stack overflow, memory parity error, or an inter-process kill signal.

Server instance 121 reacts by performing an emergency shutdown of itself. An emergency shutdown may involve suspending ordinary transactional processing of server instance 121 and synchronously shipping its lingering redo data to standby database 112.

Synchronous shipping of redo data involves more or less immediately flushing (delivering) all unshipped redo data to standby database 112. This flushing includes sending remainder 151 and the current value of instance recovery counter 131.

In step 202, an association between the first recovery count and a first standby redo log is stored into the standby database. For example, standby database 112 may have a lookup table that maps received recovery counts to particular standby redo logs.

3.1 Instance Recovery

After (and perhaps during) step 202, server instance 121 is nonoperational (completely crashed), which primary DBMS 101 detects and repairs. In a preferred embodiment not shown, a surviving server instance, such as 122, detects the crash and performs instance recovery upon server instance 121, which generally involves restoring integrity to the mutable files of server instance 121, such as over a cross-mounted filesystem.

Steps 203A-C occur in response to recovering server instance 121. In step 203A, a second server instance increments its own instance recovery counter to a second recovery count. For example, server instance 122 increments its own instance recovery counter because server instance 122 recovered server instance 121.

Steps 203B-C may concurrently occur. In step 203B, the second server instance publishes the second recovery count to server instances of the primary database. For example, server instance 122 publishes the current value of its instance recovery counter to at least server instance 121.

In an embodiment, server instance 122 publishes its recovery count by broadcast, such as by user datagram protocol (UDP). In an alternate embodiment, server instance 122 writes its recovery count to a file that the other server instances cross mount.

In step 203C, the second server instance synchronously sends the second recovery count to the standby database. For example, server instance 122 sends its recovery count to standby database 112. For example, server instance 122 may (synchronously) flush its undelivered redo data to standby database 112 and include the recovery count.

In step 204A and in response to the second recovery count being sent, standby DBMS 102 stores an association between the second recovery count and a second standby redo log. For example, the DBMS stores, into standby database 112 a recovery count and instance redo log identifier that was sent in step 203C.

3.2 Return to Service

In step 204B, the first server instance is restarted. For example, primary DBMS 101 was informed by server instance 122 that server instance 121 is restored, and the DBMS reacts by restarting server instance 121.

In step 205A, the first server instance makes a change to the contents of the primary database. For example, server instance 121 resumes transactional processing, which causes change 190 within contents 180.

In step 205B, the first server instance stores, into the first instance redo log, a redo entry that defines the change made in step 205A. For example, server instance 121 creates and stores redo entry 152 into instance redo log 140.

Ideally, redo entry 152 is replicated within standby redo log 161. However, an emergency failover may prevent such replication.

Furthermore with asynchronous replication, a no data lost (NDL) flag (from related U.S. Pat. No. 7,599,967) stored at standby database 112 may become stale (inaccurate) if emergency failover prevents replication for redo entry 152. This may cause a false positive with an NDL flag, such that the standby DBMS may mistakenly decide that a given redo log is consistent (up to date) because of a stale NDL flag being set. However as explained later herein, a recovery count may avoid this false positive and so is a reliability improvement over existing NDL techniques.

3.3 Failover

In step 205C, the standby DBMS detects that the primary database should failover to the standby database. For example, database 111-112 occupy separate data centers, and the DBMS detects that the data center of primary database 111 has lost Internet connectivity. This detection may involve a heartbeat that indicates availability of the primary database, or a watchdog timer that the primary DBMS must periodically restart to indicate availability of the primary.

Step 205C initiates failover. Failover entails standby DBMS 102 rolling forward standby database 112 by partially or totally replaying some standby redo logs. This may be complicated by various concerns and boundary conditions.

For example, some of the standby redo logs or portions of them may be irrelevant to rolling forward. Standby DBMS 102 may record how much of each standby redo log has previously been replayed.

When standby DBMS 102 rolls forward standby database 112, standby DBMS 102 should first detect which standby redo logs need replaying, and which portions (timespans) of them. Replay techniques are discussed later herein.

3.4 Conditional Replay

In step 206, recovery counts associated with all applicable standby redo logs are compared to check for unanimity. For example, the only standby redo logs that are applicable are those that have redo entries that actually need replaying.

In that case, if both standby redo logs 161-162 need some replaying, then standby DBMS 102 detects whether recovery counts 171-172 are unanimous and present (e.g. positive integer if zero or negative indicates no associated recovery count).

If recovery counts 171-172 are identical, then standby DBMS 102 performs step 207. Otherwise, standby DBMS 102 performs step 208.

In step 207, the standby database is rolled forward fully by replaying applicable standby redo logs to their ends and without needing to contact the primary database. For example even if the data center containing the primary database is unavailable during failover, then standby DBMS 102 may still detect that the relevant standby logs are more or less guaranteed to be consistent and replay their relevant portions as explained above.

3.5 Inconsistency Found

Step 207 represents achievement of zero data loss. Whereas in step 208, discrepant recovery counts indicate possible inconsistency of at least one relevant standby redo log.

Discrepant recovery counts suggest that redo log replication fell behind for at least one server instance in the confusion of possibly multiple server instances crashing and rejoining during a same episode of system stress that ultimately triggered failover. As such, the redo log replicas are likely inconsistent, which means that some recent data was lost during failover.

In step 208, the standby redo logs are not guaranteed to be consistent and are indicated as such. For example, standby DBMS 102 may mark some or all of the standby redo logs as untrustworthy.

As such, standby database 112 will not be automatically rolled forward. In this case, standby DBMS 102 may announce or otherwise indicate to administrators or other clients that failover occurred, but that zero data loss was not achieved.

4.0 Asynchronous Replication

Figure 3:
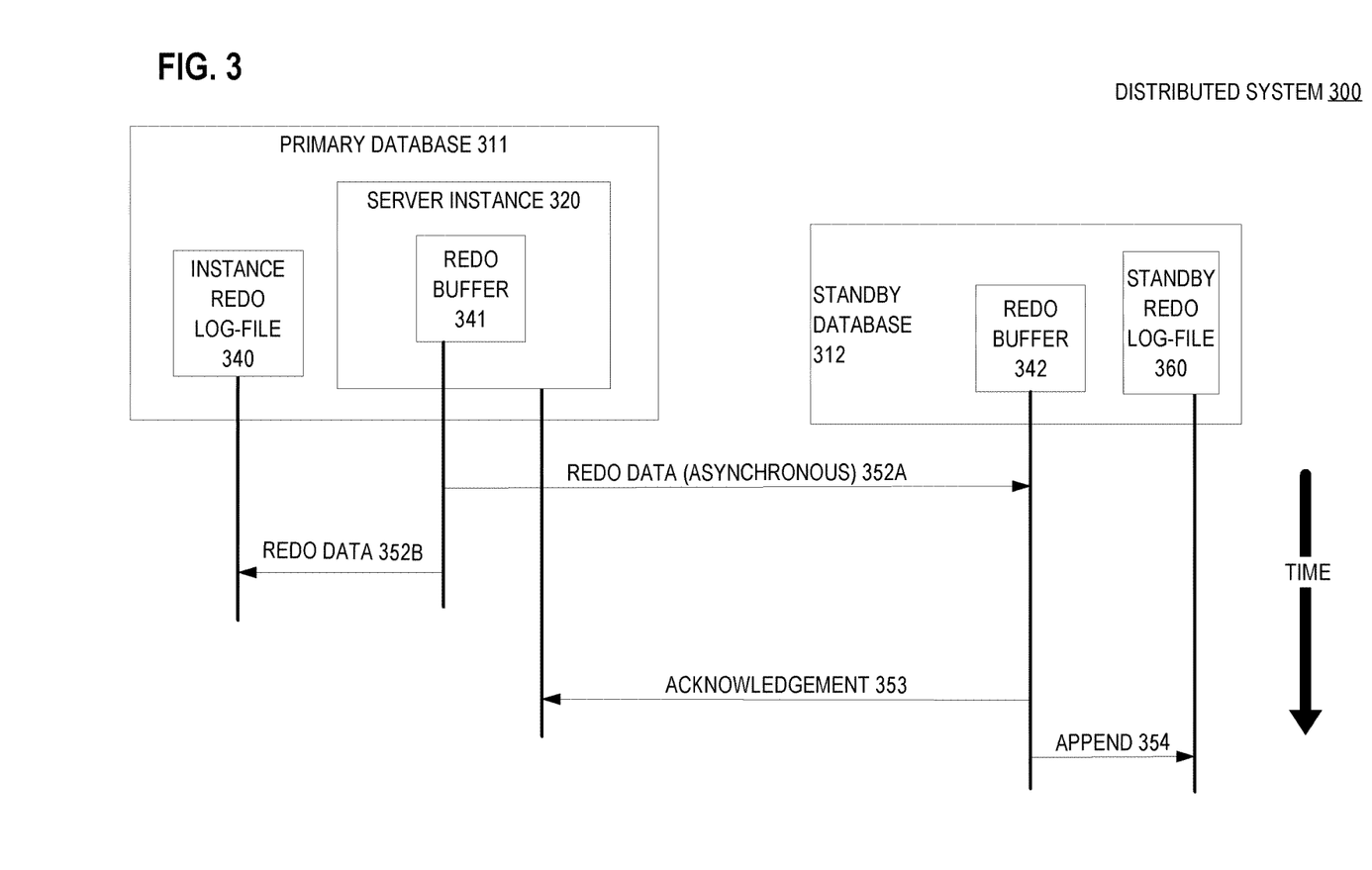
FIG. 3 is a scenario diagram that depicts an example distributed system that asynchronously delivers redo logs, in an embodiment.

FIG. 3 is a scenario diagram that depicts an example distributed system 300 that asynchronously delivers redo logs, in an embodiment. Distributed system 300 may be an implementation of distributed system 100.

Although not shown, distributed system 300 includes a primary DBMS and a standby DBMS that contain respective databases 311-312 arranged as a high-availability pair. During ordinary operation, the primary DBMS may asynchronously stream redo entries from primary database 311 to standby database 312 to achieve redo log replication. Stream transport may occur as follows.

In step 352A, a server instance sends redo data to a standby database for replication. Server instance 320 contains redo buffer 341 that stores recent redo entries in volatile memory while awaiting durable storage.

For example, redo buffer 341 may be a circular buffer. Server instance 320 may asynchronously send individual or multiple redo entries from redo buffer 341 to standby database 312 for replication.

4.1 Transport Asynchrony

Asynchronous transmission may be achieved at various levels within a network stack. For example, UDP provides asynchronous transport.

Alternatively, transport control protocol (TCP) may be used so long as server instance 320 does not block (wait) for a reply (acknowledgement) from the standby DBMS. For example, server instance 320 does not block when redo data 352A is sent.

As such in step 352B, the server instance may durably store the same redo data more or less immediately after, immediately before, or concurrent to step 352A, depending on the implementation. For example, server instance 320 writes the same redo data to instance redo log-file 340, which may occupy network attached storage that is shared with other server instances of primary database 311.

Perhaps because of network latency, server instance 320 might not receive a replication acknowledgement until after the redo data is durably stored by server instance 320. For example, standby database 312 may have its own buffering, such as redo buffer 342. For example at standby database 312, the standby DBMS receives redo data 352A, which the standby DBMS stores into redo buffer 342, and the standby DBMS eventually sends acknowledgement 353 to server instance 320.

4.2 Standby Activity

Redo data 352A and acknowledgement 353 may each regard one or more redo entries. Furthermore, the set of redo entries of redo data 352A may be identical or partially overlapping to the set of redo entries of acknowledgement 353.

In step append 354, redo log replication is fully achieved by appending the redo data to a corresponding standby redo log. For example, the standby DBMS writes the redo data from redo buffer 342 to the end of standby redo log-file 360, shown as append 354. In a preferred embodiment, redo log-files 340 and 360 occupy separate file systems, such that standby database 312 may be operated after failover even when the standby DBMS cannot reach the filesystem of instance redo log-file 340.

5.0 Transactions

Figure 4:
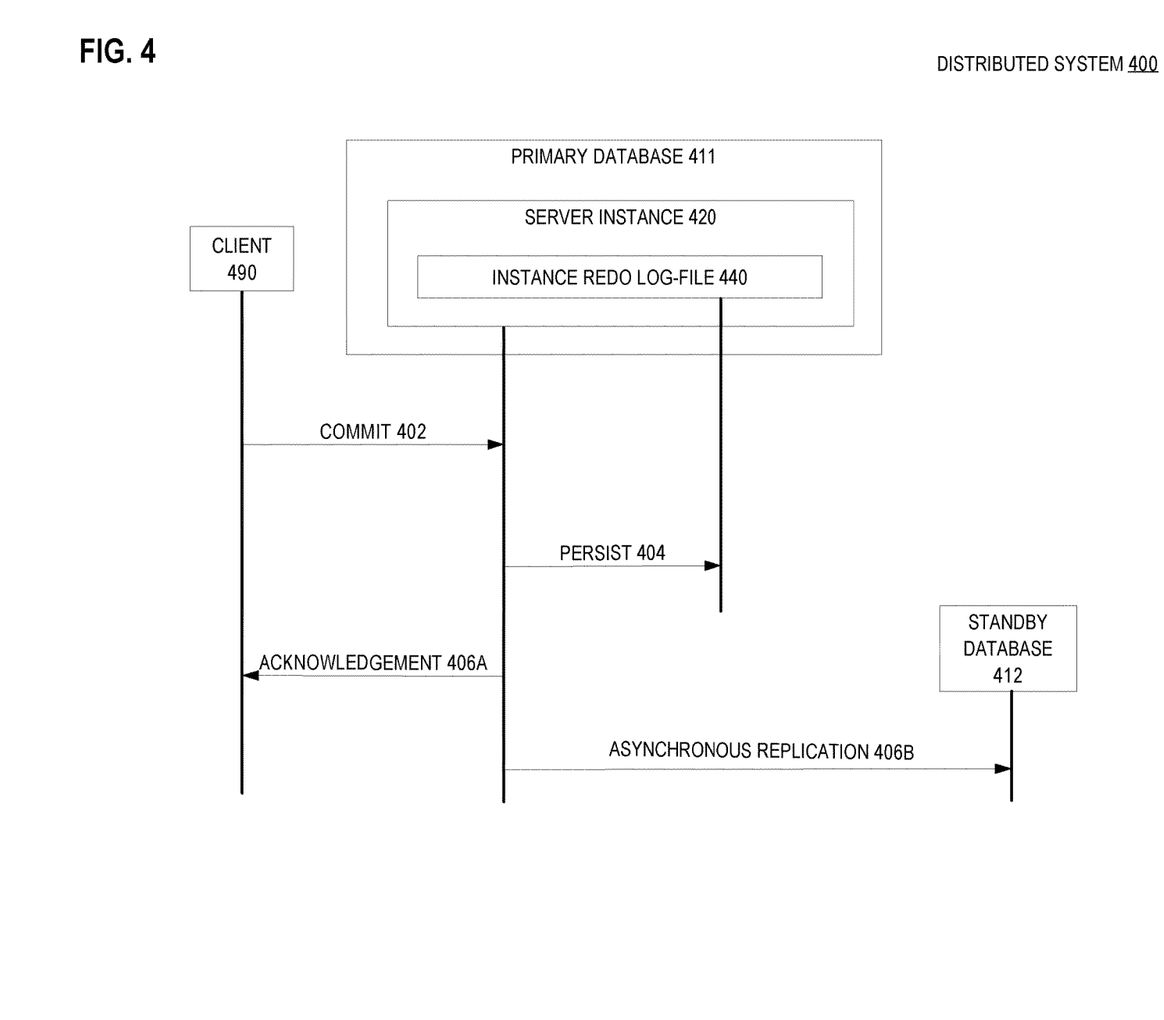
FIG. 4 is a scenario diagram that depicts an example distributed system that decouples transaction management from asynchronous replication of redo logs, in an embodiment.

FIG. 4 is a scenario diagram that depicts an example distributed system 400 that decouples transaction management from asynchronous replication of redo logs, in an embodiment. Distributed system 400 may be an implementation of distributed system 100.

Distributed system 400 includes a primary DBMS and a standby DBMS that contain respective databases 411-412 arranged as a high-availability pair. During ordinary operation a server instance may acknowledge that a database transaction is committed without waiting for redo log replication.

Primary database 411 contains server instances, such as 420, to which clients, such as 490, may issue commands. Client 490 may be software that issues database commands, such as interactive or scripted SQL statements that pass through an open database connectivity (ODBC) driver.

5.1 Commit

A client may issue a commit command to demand completion of a transaction. For example, client 490 sends commit 402 to server instance 420.

The server instance creates and durably writes a redo entry for the commit. For example, server instance 420 creates a redo entry for commit 402 and durably writes the redo entry to the end of instance redo log-file 440, shown as persist 404.

Application concerns, such as business rules, may require that client 490 wait for an acknowledgement that commit 402 succeeded or failed. Without waiting for redo log replication, server instance 420 may send acknowledgment 406A to client 490 to indicate that the transaction was successfully committed.

Replication flushing of the redo entry for the commit may occur later, such as after internetwork congestion. For example, server instance 420 will eventually send the redo entry to standby database 412, shown as asynchronous replication 406B.

6.0 Rolling Forward

Figure 5:
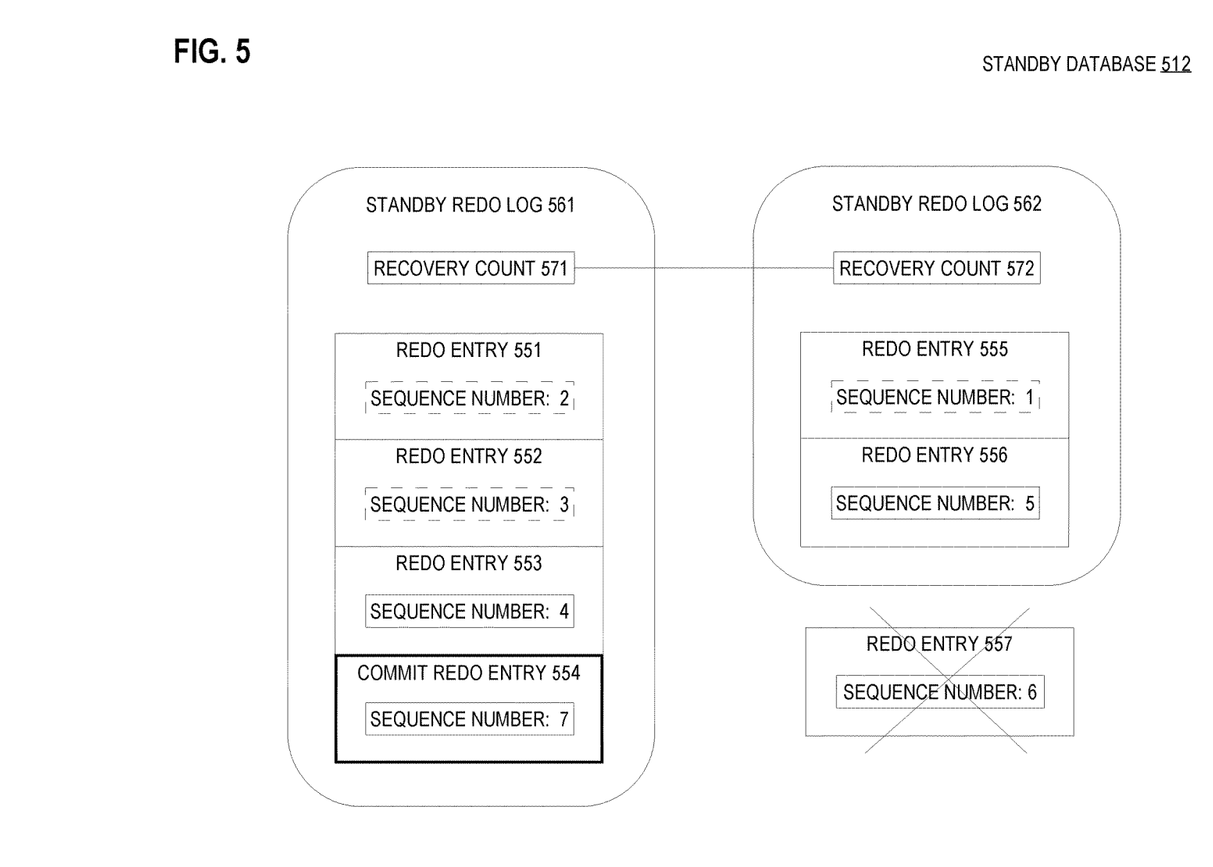
FIG. 5 is a block diagram that depicts an example standby database that may be rolled forward by replaying redo entries, in an embodiment.

FIG. 5 is a block diagram that depicts an example standby database 512 that may be rolled forward by replaying redo entries, in an embodiment. Standby database 512 may be an implementation of standby database 112. Although not shown, standby database 112 is operated by a standby DBMS.

Although not shown, standby database 512 may receive redo entry streams concurrently from multiple server instances of a primary database within a primary DBMS. As such, rolling forward standby database 512 during failover may involve wholly or partially replaying multiple standby redo logs, such as 561-562, with the extent of replay dependent upon whether recovery counts 571-572 of respective standby redo logs 561-562 are unanimous.

As such, the contents of the primary database may undergo many revisions and demand much replication. The primary DBMS may assign a globally unique identifier to each revision, such as from a monotonically increasing sequence of numbers, such as a timestamp of micro-, or nano-seconds from a system clock. For example, each of redo items 551-557 has its own unique sequence number as shown.

6.2 Seeking Past

By inspecting sequence numbers of redo entries, the standby DBMS may skip an old (already replayed) portion of a standby redo log. For example, the standby DBMS may seek past the old portion by sequentially scanning timestamps of redo entries 551-552 within standby redo log 561.

In an embodiment not shown, the standby DBMS achieves random access past the old portion based on maintaining a lookup table that maps a redo log identifier to a current offset, in bytes or fixed-size records, into a standby redo log.

No matter what mechanism the standby DBMS uses to track replay progress, the tracking stays current if the standby DBMS updates the tracking whenever a redo entry is replayed.

6.3 Stopping Early

A complication is that an instance server of the primary database may have crashed with unsent redo entries. For example, a distributed transaction may create redo entries on a first and a second server instance.

Standby redo log 561 may be associated with the first server instance. Furthermore, standby redo log 561 may contain a commit for the transaction in redo entry 554 with sequence number 7, even though the second server instance failed (shown with an X) to ship redo entry 557 that is involved with the same transaction and has earlier sequence number 6.

That is, standby database 512 never received redo entry 557. As such, the DBMS should stop replaying the standby redo log before reaching commit redo entry 554, because its sequence number is too high (higher than the sequence number of unreceived redo entry 557).

6.4 Hybrid Techniques

Furthermore, the techniques expressly described herein may be understood, applied, or modified according to the techniques described in related U.S. Pat. No. 7,599,967. For example, the presence or absence of a recovery count within a redo replication message may be interpreted as a respectively set or cleared binary flag that may indicate completeness of replication of a given standby redo log. As such, that recovery count may also be interpreted as a no data lost (NDL) flag and used accordingly, as described in that patent.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
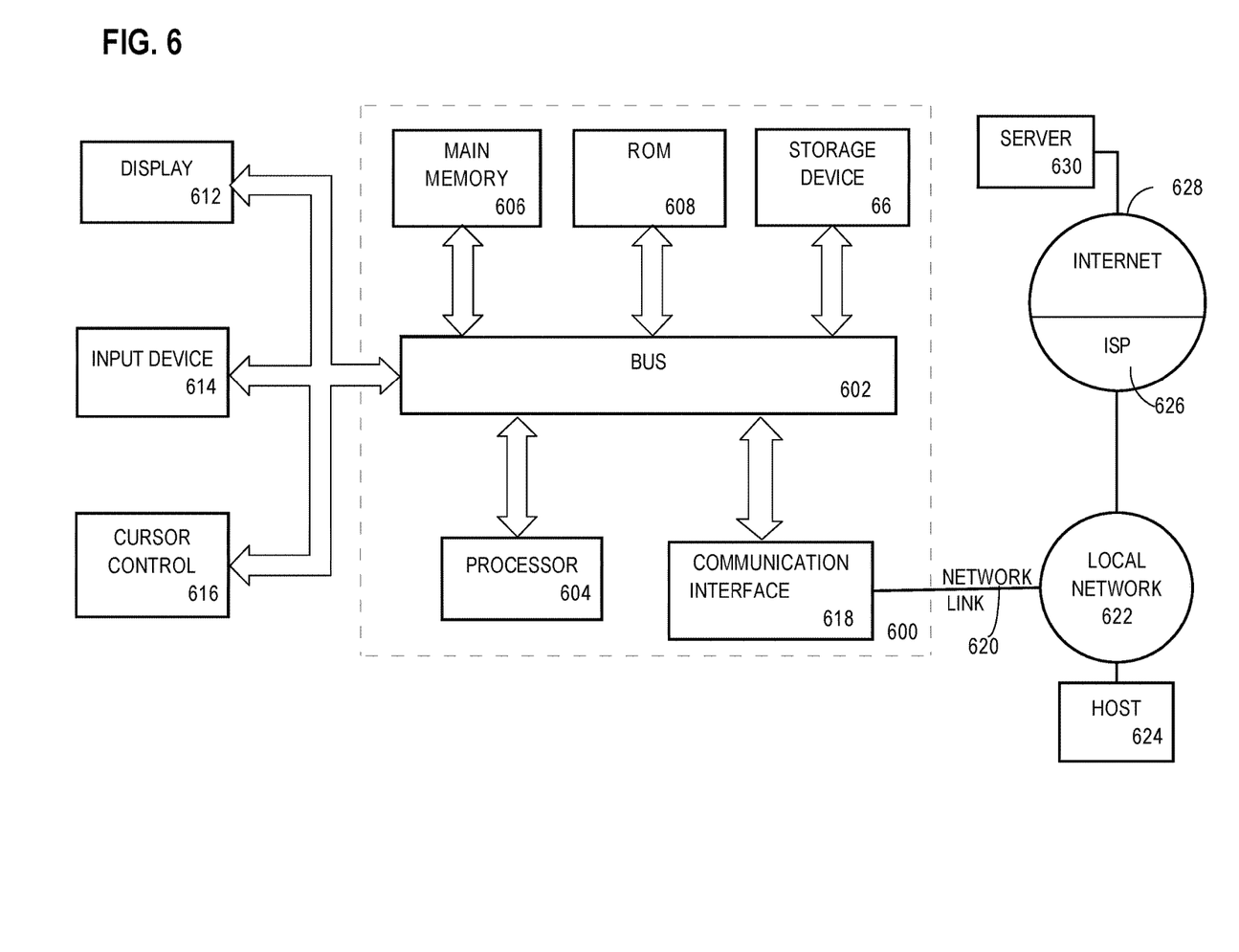
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 66, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 66. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 66. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 66 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 66, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
sending, from a first server instance of a plurality of server instances of a primary database to a server of a standby database:
a first recovery count of an instance recovery counter that indicates a tally of crashes that occur within the plurality of server instances, and
a remainder of a first instance redo log of the first server instance;
storing, by the server of the standby database, an association of the first recovery count with a first standby redo log that corresponds to the first instance redo log;
the server of the standby database storing an association of a second recovery count with a second standby redo log;
the server of the standby database detecting, in response to detecting that the primary database should failover, whether there is a same recovery count that is associated with both of the first standby redo log and the second standby redo log;
if there is a same recovery count, rolling forward the standby database by replaying the first standby redo log and the second standby redo log;
otherwise, indicating that the first standby redo log and the second standby redo log are not guaranteed to be consistent.

2. The method of claim 1 further comprising:
the first server instance sending a redo entry to the server of the standby database;
the server of the standby database appending the redo entry to the first standby redo log.

3. The method of claim 2 further comprising the first server instance durably storing the redo entry after sending the redo entry.

4. The method of claim 2 wherein:
the redo entry comprises a commit of a database transaction;
the method further comprises:
indicating, to a client that the database transaction was committed;
sending, to the server of the standby database and after indicating that the database transaction was committed, the redo entry.

5. The method of claim 3 further comprising after durably storing the redo entry the first server instance receiving an acknowledgement that the redo entry was received by the server of the standby database.

6. The method of claim 1 further comprising, if there is not a same recovery count, replaying a portion of each standby redo log of the first standby redo log and the second standby redo log.

7. The method of claim 6 further comprising:
selecting a tail redo entry that is a most recent redo entry of a standby redo log, and
selecting a stop redo entry that is a least recent tail redo entry of all standby redo logs of the standby database;
wherein the portion of each standby redo log has no content that is more recent than the stop redo entry.

8. The method of claim 1 further comprising:
in response to recovering the first server instance, a second server instance of the plurality of server instances of the primary database incrementing the instance recovery counter to the second recovery count;
the second server instance publishing the second recovery count to the plurality of server instances of the primary database, and
the second server instance sending the second recovery count to the server of the standby database;
restarting the first server instance;
after restarting the first server instance, the first server instance making a change to contents of the primary database;
the first server instance storing, into the first instance redo log, a redo entry that defines the change to the contents.

9. One or more non-transitory computer-readable media storing instructions that, when executed by one or more processors, cause:
sending, from a first server instance of a plurality of server instances of a primary database to a server of a standby database:
a first recovery count of an instance recovery counter that indicates a tally of crashes that occur within the plurality of server instances, and
a remainder of a first instance redo log of the first server instance;
storing, by the server of the standby database, an association of the first recovery count with a first standby redo log that corresponds to the first instance redo log;
the server of the standby database storing an association of a second recovery count with a second standby redo log;
the server of the standby database detecting, in response to detecting that the primary database should failover, whether there is a same recovery count that is associated with both of the first standby redo log and the second standby redo log;
if there is a same recovery count, rolling forward the standby database by replaying the first standby redo log and the second standby redo log;
otherwise, indicating that the first standby redo log and the second standby redo log are not guaranteed to be consistent.

10. The one or more non-transitory computer-readable media of claim 9 wherein the instructions, when executed by the one or more processors, further cause:
the first server instance sending a redo entry to the server of the standby database;
the server of the standby database appending the redo entry to the first standby redo log.

11. The one or more non-transitory computer-readable media of claim 10 wherein the instructions, when executed by the one or more processors, further cause the first server instance durably storing the redo entry after sending the redo entry.

12. The one or more non-transitory computer-readable media of claim 10 wherein:
the redo entry comprises a commit of a database transaction;
the instructions, when executed by the one or more processors, further cause:
indicating, to a client that the database transaction was committed;

sending, to the server of the standby database and after indicating that the database transaction was committed, the redo entry.

13. The one or more non-transitory computer-readable media of claim 11 wherein the instructions, when executed by the one or more processors, further cause, after durably storing the redo entry, the first server instance receiving an acknowledgement that the redo entry was received by the server of the standby database.

14. The one or more non-transitory computer-readable media of claim 9 wherein the instructions, when executed by the one or more processors, further cause, if there is not a same recovery count, replaying a portion of each standby redo log of the first standby redo log and the second standby redo log.

15. The one or more non-transitory computer-readable media of claim 14 wherein the instructions, when executed by the one or more processors, further cause:
selecting a tail redo entry that is a most recent redo entry of a standby redo log, and
selecting a stop redo entry that is a least recent tail redo entry of all standby redo logs of the standby database;
wherein the portion of each standby redo log has no content that is more recent than the stop redo entry.

16. A database management system comprising:
one or more interconnected computers configured to host and/or operate databases of a high-availability pair;
a primary database configured to be operated in the high-availability pair by a plurality of server instances that include a first server instance and a second server instance;
a standby database connected to the primary database and configured to be operated in the high-availability pair;
wherein the first server instance is configured to:
send, to a server of the standby database, a first recovery count of an instance recovery counter that indicates a tally of crashes that occur within the plurality of server instances, and a remainder of a first instance redo log of the first server instance;
make, after restarting, a change to contents of the primary database,
store, into the first instance redo log, a redo entry that defines the change to the contents;
wherein the second server instance is configured to:
in response to recovering the first server instance, increment the instance recovery counter to a second recovery count,
publish the second recovery count to the plurality of server instances of the primary database,
send the second recovery count to the server of the database, and restart the first server instance;
wherein the database management system is further configured to:
store an association of the first recovery count with a first standby redo log that corresponds to the first instance redo log;
store, by the server of the standby database, an association of the second recovery count with a second standby redo log, and
detect, by the server of the standby database and in response to detecting that the primary database should failover, whether there is a same recovery count that is associated with both of the first standby redo log and the second standby redo log;
if there is a same recovery count, roll forward the standby database by replaying the first standby redo log and the second standby redo log;
otherwise, indicate that the first standby redo log and the second standby redo log are not guaranteed to be consistent.

17. The database management system of claim 16 wherein:
the first server instance is further configured to send a second redo entry from the first server instance to the server of the standby database for replication;
the database management system is further configured to append, at the standby database, a redo entry to the first standby redo log.

18. The database management system of claim 17 wherein the first server instance is further configured to durably store the redo entry after sending the redo entry.

19. The database management system of claim 18 wherein the first server instance is further configured to, after durably storing the redo entry, receive an acknowledgement that the redo entry was received by the server of the standby database.

20. The database management system of claim 16 wherein the database management system is further configured to, if there is not a same recovery count, replay a portion of each standby redo log of the first standby redo log and the second standby redo log.

21. The database management system of claim 20 wherein the database management system is further configured to:
select a tail redo entry that is a most recent redo entry of a standby redo log, and
select a stop redo entry that is a least recent tail redo entry of all standby redo logs of the standby database;
wherein the portion of each standby redo log has no content that is more recent than the stop redo entry.

* * * * *